United States Patent
Loder

(10) Patent No.: US 9,251,282 B2
(45) Date of Patent: Feb. 2, 2016

(54) SYSTEMS AND METHODS FOR DETERMINING COMPLIANCE OF REFERENCES IN A WEBSITE

(75) Inventor: Chad Loder, Los Angeles, CA (US)

(73) Assignee: RAPID7 LLC, Newton, MA (US)

(*) Notice: Subject to any disclaimer, the term of this patent is extended or adjusted under 35 U.S.C. 154(b) by 81 days.

(21) Appl. No.: 12/819,510

(22) Filed: Jun. 21, 2010

(65) Prior Publication Data

US 2011/0314152 A1 Dec. 22, 2011

(51) Int. Cl.
*G06F 15/173* (2006.01)
*G06F 17/30* (2006.01)

(52) U.S. Cl.
CPC .............. *G06F 17/30887* (2013.01)

(58) Field of Classification Search
CPC . G06F 21/56; G06F 2221/2119; G06F 21/55; G06F 21/577; G06F 21/554; H04L 63/1408; H04L 63/1416; H04L 63/145
USPC ......... 709/203, 212, 216, 217, 219, 224, 225, 709/226; 726/1, 2, 22, 26
See application file for complete search history.

(56) References Cited

U.S. PATENT DOCUMENTS

| | | | | |
|---|---|---|---|---|
| 5,678,041 A * | 10/1997 | Baker et al. | | |
| 6,928,455 B2 * | 8/2005 | Dougu et al. | | |
| 7,877,801 B2 * | 1/2011 | Repasi | ............. | G06F 21/56 713/187 |
| 7,877,806 B2 * | 1/2011 | Repasi | ............. | G06F 21/554 713/188 |
| 8,073,855 B2 * | 12/2011 | Nagoya | ............. | H04L 63/101 707/754 |
| 8,171,107 B2 * | 5/2012 | Vignisson et al. | ............. | 709/217 |
| 8,286,241 B1 * | 10/2012 | Yeo | ............. | H04L 63/101 726/11 |
| 8,336,092 B2 * | 12/2012 | Nagoya | ............. | G06Q 10/10 726/11 |
| 8,544,086 B2 * | 9/2013 | Field | ............. | G06F 21/56 713/164 |
| 8,590,045 B2 * | 11/2013 | Niemela | ............. | G06F 21/566 726/24 |
| 8,782,786 B2 * | 7/2014 | Baccas | ............. | G06F 21/56 709/223 |
| 9,112,897 B2 * | 8/2015 | Teo | ............. | G06F 21/566 |
| 2005/0102407 A1 * | 5/2005 | Clapper | ............. | 709/228 |
| 2007/0028291 A1 * | 2/2007 | Brennan | ............. | H04L 63/1408 726/1 |
| 2007/0028303 A1 * | 2/2007 | Brennan | ............. | G06F 21/55 726/24 |
| 2007/0028304 A1 * | 2/2007 | Brennan | ............. | G06F 21/55 726/24 |
| 2008/0066180 A1 * | 3/2008 | Repasi et al. | ............. | 726/24 |
| 2008/0307339 A1 * | 12/2008 | Boro et al. | ............. | 715/764 |
| 2009/0083852 A1 * | 3/2009 | Kuo | ............. | G06F 21/564 726/22 |
| 2009/0254568 A1 * | 10/2009 | Vignisson et al. | ............. | 707/10 |
| 2009/0254617 A1 * | 10/2009 | Vignisson et al. | ............. | 709/204 |
| 2009/0254656 A1 * | 10/2009 | Vignisson et al. | ............. | 709/224 |
| 2009/0254862 A1 * | 10/2009 | Viginisson et al. | ............. | 715/810 |
| 2009/0300768 A1 * | 12/2009 | Krishnamurthy et al. | ............. | 726/26 |
| 2010/0094612 A1 * | 4/2010 | Weerasinghe | ............. | 703/23 |
| 2010/0205215 A1 * | 8/2010 | Cook et al. | ............. | 707/781 |
| 2010/0205297 A1 * | 8/2010 | Sarathy | ............. | 709/224 |

(Continued)

*Primary Examiner* — Sargon Nano
(74) *Attorney, Agent, or Firm* — MH2 Technology Law Group, LLP

(57) ABSTRACT

Systems and methods of determining compliance of content in a website or web application are disclosed. The systems and methods comprise a compliance tool to retrieve data associated with website or web application content. The compliance tool can scan the data to determine references to network locations. The compliance tool can compare the references to one or more approval rules to determine whether the references comply with the approval rules. A report can be compiled and outputted that indicates which references comply and which references do not comply with the approval rules. A user can have the option to add non-complying references to an approved list. The compliance tool can further remove non-complying references from the website or web application data and/or register non-complying references with a firewall.

22 Claims, 5 Drawing Sheets

(56) References Cited

U.S. PATENT DOCUMENTS

| | | | |
|---|---|---|---|
| 2010/0205665 A1* | 8/2010 | Komili et al. | 726/12 |
| 2010/0293616 A1* | 11/2010 | Young | 726/25 |
| 2010/0316300 A1* | 12/2010 | Epshtein et al. | 382/229 |
| 2011/0065419 A1* | 3/2011 | Book et al. | 455/411 |
| 2011/0078550 A1* | 3/2011 | Nabutovsky | 715/206 |
| 2012/0216245 A1* | 8/2012 | Vignisson et al. | 726/1 |
| 2012/0324094 A1* | 12/2012 | Wyatt | H04W 4/003 709/224 |
| 2012/0324568 A1* | 12/2012 | Wyatt | G06F 21/51 726/13 |

* cited by examiner

SYSTEMS AND METHODS FOR DETERMINING COMPLIANCE OF REFERENCES IN A WEBSITE

FIELD OF THE INVENTION

This invention relates to network and website security.

BACKGROUND OF THE INVENTION

In a computing network and related systems, a blacklist can be used to list network locations that a website or web application is prevented from linking to or accessing. In exemplary situations, the website or web application can comprise references to other network locations, and a system can compare a uniform resource locator (URL), domain, or similar reference of the network locations to network locations on the blacklist. If the reference of the network location matches a network location on the blacklist, then the website or web application will be deemed to not comply with the blacklist and content from the network location will not be accessed via the network. Blacklisting can be useful for blocking access to network locations that are known to be malicious and/or unsecured, or that facilitate the installation or the spread of spyware, malware, viruses, and/or the like. Further, the blacklisting approach can protect networks from security breaches, hacks, network attacks, and/or the like.

Blacklisting, however, can be a tedious or even futile effort. In particular, every day new malicious or otherwise potentially harmful network locations appear that need to be included on a blacklist. A manager or overseer of the blacklist normally does not include a network location on the blacklist until the manager knows of the network location and/or knows that the network location belongs on the blacklist, which can take time. Therefore, the malicious website can pose a security concern because the network location can be accessed by or embedded in websites or web applications prior to the network location being added to the blacklist. Further, a blacklist that constantly updates with new malicious network locations not only will be infinitely large but will likely never be up to date with all current malicious sites.

A need, therefore, exists for a network administrator to allow websites and web applications to comprise references to only network locations that are known to be harmless or otherwise approved for access. Further, a need exists for a listing of network locations that is not exceedingly large or in need of constant updating.

BRIEF DESCRIPTION OF THE DRAWINGS

The accompanying drawings, which are incorporated in and constitute a part of this specification, illustrate embodiments of the disclosure and together with the description, serve to explain the principles of the disclosure. In the figures.

Figure 1:
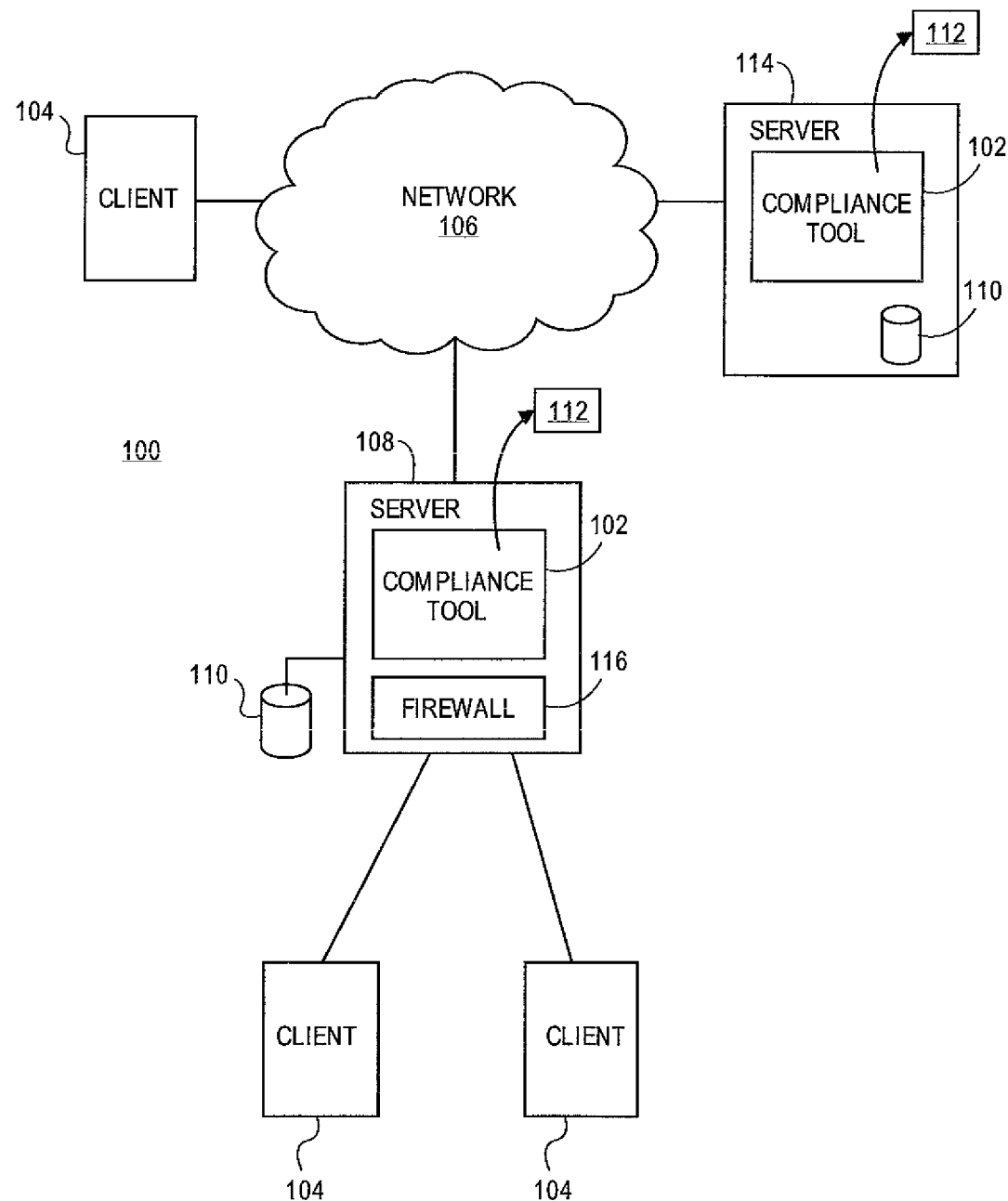
FIG. 1 is block diagram of an exemplary environment in which a compliance tool can analyze the compliance of content on a website or web application, according to various embodiments.

It should be noted that some details of the drawings have been simplified and are drawn to facilitate understanding of the embodiments rather than to maintain strict structural accuracy, detail, and scale.

DESCRIPTION OF THE EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific exemplary embodiments. Electrical, mechanical, logical and structural changes may be made to the exemplary embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for determining compliance of content in a website or web application. In particular, an owner or administrator of a website or web application can desire to determine if data content associated with the website or web application is harmful or malicious to the website or web application, or to users accessing the data content. A compliance tool can interface with a server hosting the website or web application to scan data associated with the website or web application for indications of references to network locations. As understood herein, the references to network locations can be links to or associations with websites and web applications, file-transfer protocol (FTP) sites, internal domain locations, remote servers or repositories, and the like. It should be appreciated that the references to the network locations can be external to the website or web application, or local to the website or web application. The compliance tool can store one or more rules that can be used to determine whether the references to the network locations are approved. The rules can comprise a compliance with an approved list or "whitelist" of allowed references to network locations, cryptographic validation that the entity hosting content containing the references to the network locations possesses a valid certificate from a certificate authority approved to embed or link the content, validation of content directed to by the references to the network location, and the like. In embodiments, systems and methods can validate certificates of various protocols, such as secure socket layer (SSL), domain name system security extensions (DNSSEC), and others. In one example, the whitelist can comprise a list of one or more references to approved network locations. For example, the whitelist can comprise a list of approved URLs, embeds, domains, URL patterns, file extensions, file types, and/or combinations thereof. In embodiments, the compliance tool can extract references to network locations contained in websites and web applications from the websites or web applications. In embodiments, the compliance tool can compare the extracted references to the network locations contained in the websites or web applications to the one or more rules to determine compliance with the one or more rules. Upon comparison, if a reference from the extracted network locations contained in the websites or web applications does not match a whitelist entry or does not comply with the one or more rules, the compliance tool can flag the reference as a violation.

To determine compliance, the compliance tool can be configured to generate an enumerated list of references contained in a website or web application. For example, a scan module associated with the compliance tool can be configured to scan and compile data associated with the website or web application to generate the enumerated list. In embodiments, the scan module can automatically or manually compile the enumerated list. For example, the scan module can be configured as a "crawler" that can traverse a website or web application, a static source code analyzer that can analyze source code of the website or web application, and/or a binary code analyzer which can analyze compiled binary code or bytecode of the website or web application.

In embodiments, the enumerated list can be generated by a remote or external service or system separate from the compliance tool, and the remotely generated enumerated list can be stored in a remote or external database. The compliance tool can access the remotely generated enumerated list from the external database or the external source. In embodiments, the compliance tool can be implemented as a software application that can be utilized directly by users. Further, in embodiments, the methods as described herein can be delivered by the compliance tool as an online service. Further, in embodiments, the compliance tool as described herein can be delivered as a software as a service (SaaS) model.

The compliance tool can compile and output a report indicating whether the references to the network locations extracted from the websites and web applications comply with the one or more rules. The report can be a detailed listing of the references identified in data content associated with the website or web application, along with a compliance status of each of the references. The compliance tool can be configured to remove references from the website or web application data that do not comply with the one or more rules. Further, an owner or administrator of the website or web application can request to add one or more references to a whitelist associated with the one or more rules. In embodiments, the compliance tool can automatically or manually register violations with a firewall such as a web application firewall (WAF). In embodiments, the WAF can block connection attempts to network locations that contain references registered with the WAF or are otherwise in violation of the rules (e.g. the whitelist).

FIG. 1 illustrates an exemplary environment 100 in which a compliance tool 102 associated with a server 108 can receive a request to scan data associated with a website or web application for references to non-complying network locations. While FIG. 1 illustrates various systems contained in the environment 100, one skilled in the art will realize that these systems are exemplary and that the environment 100 can include any number and type of systems.

As illustrated in FIG. 1, the server 108 of the environment 100 can be associated with systems of public or private entities, such as governmental agencies, individuals, businesses, partnerships, companies, corporations, etc. The server 108 can host and/or serve one or more websites or web applications of the public or private entities that are accessible to users through a network 106 such as the Internet. Further, the server 108 can receive requests from one or more clients 104 to access the website or web application. As illustrated in FIG. 1, the requests can be received directly from the clients 104 or indirectly via the network 106. The clients 104 and or server 108 can be any type of conventional computing systems, such as desktops, laptops, servers, etc. The clients 104 and/or server 108 can include hardware resources, such as processors, memory, network hardware, storage devices, and the like, and software resources, such as operating systems (OS), application programs, and the like. Further, the clients 104 and/or server 108 can be located at any location relative to each other and the other components of the environment 100, and can be accessed by any user, operator, administrator, owner, and the like.

The server 108 can host websites, webpages, web applications, forums, chat engines, and the like that are accessible to users of the clients 104. In embodiments, the server 108 can deliver websites or web applications to the clients 104 via Hypertext Transfer Protocol (HTTP) and other conventional delivery methods. The websites or web applications can comprise content found in HTML documents, such as images, style sheets, and JavaScripts. Further, web applications can be rich internet applications (RIAs) developed in technologies such as Adobe Flash®, Adobe Flex®, SilverLight®, JavaFX®, and other technologies, as well as hyperlink-aware multimedia formats such as interactive or streaming videos and music, or PDFs or Word® documents containing hyperlinks. In embodiments, the HTTP protocol can provide for "HTTP redirection" in which the hyperlink can be provided by the server 108 in a "protocol envelope" of the response. In embodiments, the systems and methods can detect such redirections and implement the determination of compliance of the redirections, as discussed herein.

In embodiments, the websites or web applications can allow users of the websites or web applications to embed references to network locations in postings. As understood herein, the references to network locations can be links to or associations with websites and web applications, file-transfer protocol (FTP) sites, internal domain locations, remote servers or repositories, and the like. It should be appreciated that the references to the network locations can be external to the website or web application, or local to the website or web application. For instance, if the website is a forum, a user can respond to a specific post in the forum by providing a hyperlink to an external website such that other users can select the hyperlink and connect to the external website. Further, for instance, a user can maintain a website or web application hosted by the server 108, such as a weblog, in which the user can provide references to other websites that other users can select when accessing the website. In embodiments, references to network locations can be embedded by an owner or operator associated with the websites or web applications. It should be appreciated that other types of websites or web applications, as well as methods of referencing, linking, embedding, or otherwise providing references to external network content in the websites or web applications, are contemplated.

In embodiments, a repository 110 can be configured to interface with the compliance tool 102 and/or the server 108. The repository 110 can be configured to store data associated with one or more websites or web applications hosted and/or served by the server 108. In embodiments, the stored data can be associated with websites or web applications hosted by the server 108. In embodiments, the stored data can be HTML code, JavaScript references, image data, embedded references, file extensions, file types, and other data commonly associated with a website or web application. Further, in embodiments, the stored data can be information that website or web application users have provided to or posted on the website or web application, such as, for example, responses in a forum thread.

The compliance tool 102 can access, retrieve, and/or scan website or web application data stored in the repository 110 to determine if there are any references embedded or posted on the website or web application that connect to network locations that can be malicious and/or unsecured, or that facilitate the installation or the spread of spyware, malware, viruses, and/or the like. In embodiments, an owner or administrator of a website or web application can submit a request to the compliance tool 102 to have the website or web application scanned. In embodiments, the compliance tool 102 can access, retrieve, and/or scan data associated with a website during any production phase. For instance, the compliance tool 102 can access, retrieve, and/or scan data associated with a website that is completed and live. Likewise, the compliance tool 102 can access, retrieve, and/or scan data associated with a website during a development phase of the website. For example, the data can be accessed, retrieved, and/or scanned as part of a quality assurance (QA) process that can be run in a "staging environment," and/or the compliance tool 102 can be integrated into other website or rich internet application (RIA) development tools.

In embodiments, the compliance tool 102 can be configured to generate an enumerated list of references contained in a website or web application. In embodiments, the enumerated list can be automatically or manually compiled by a "crawler" that can traverse the website or web application, a static source code analyzer that can analyze source code of the website or web application, and/or a binary code analyzer which can analyze compiled binary code or bytecode of the website or web application.

In embodiments, the enumerated list can be generated by a remote or external service, and the remotely generated enumerated list can be stored in a remote or external database. For example, the enumerated list can be generated by an external source or service that can search websites or web applications such as, for example, Google. The compliance tool 102 can access the remotely generated enumerated list from the database or another source, or via an application programming interface (API) of the external source.

In embodiments, the compliance tool 102 can store and maintain one or more rules that are used to determine if the references contained in the website or web application data are in compliance with the one or more rules. The compliance tool 102 can compare the references in the enumerated list to the one or more rules. In embodiments, a rule maintained by compliance tool 102 can comprise an associated whitelist of approved domains, URLs, URL patterns, file extensions, file types, and the like that are known or approved to be safe, secure, or otherwise not harmful to a client or user attempting to access. For instance, if the domain google.com is on a list of approved domains, then a reference to URLs within the google.com domain in the scanned website or web application data, such as, for example, mail.google.com and maps.google.com, can be deemed to comply with the rule of the compliance tool 102. For further instance, if the URL http://www.yahoo.com is on a list of approved URLs, then a reference to http://www.yahoo.com in the scanned website or web application data can be deemed to comply with the rule of the compliance tool 102.

In other embodiments, the compliance tool 102 can comprise a rule whereby connection to a network location via a reference will be allowed only if the network location is in possession of a key signed by an approved certificate authority. In embodiments, the certificate authority can be maintained by the server or by another entity. For instance, if a reference in the scanned website or web application data links to a network location that has a key signed by a certificate authority maintained by the server 108, then the reference can be deemed to comply with the rule of the compliance tool 102. For further instance, the compliance tool 102 can comprise a rule whereby a reference should be directed to the "www" version of a network location instead of directly to a top-level domain. For example, a reference can direct to "www.rapid7.com" even though the reference can instead indicate "rapid7.com." It should be understood that other various rules associated with the approval of references to network locations are contemplated.

In other embodiments, the compliance tool 102 can comprise a rule whereby connection to a network location via a reference will be allowed only if content (files, data, etc.), which is directed to by the reference, is valid and safe. The rule can specify that the compliance tool 102 retrieves the content, which is directed to by the reference, analyzes the content based on characteristics of the content, and validates the content based on the analysis. For instance, the validation can include analyzing the content to determine if the actual content matches what is expected, for example, if a file named "report.pdf" is an actual PDF file or other type of file such as an executable ".exe" file. The validation can include comparing the content to known malicious content, such as known viruses, Trojans, etc. Likewise, the validation can include checking the content to determine if the content is safe, for example, checking the content to determine if the content is signed.

In embodiments, the compliance tool 102 can comprise a plurality of rules dependent on a type of reference in the scanned website or web application data. For instance, one rule can specify that all embedded image references in the scanned website or web application data are approved, and another rule can specify that only embedded JavaScripts from a specific JavaScript server within an entity are approved. Further, in embodiments, the rules of the compliance tool 102 can be based on a hierarchical structure within an entity. For instance, websites or web applications within a corporation, government entity, or the like can have different access rights or permissions depending on a level of the users trying to access the websites or web applications. In embodiments, the rules can take into account characteristics of local or remote servers hosting content, characteristics of the references to the network locations, the type of linking or embedding (e.g. href, direct embedding, redirect embedding, etc.), and the context in which the linking or embedding occurs (e.g. a specific webpage or website, and/or where on the webpage or website, etc.). It should be appreciated that other various rules and combinations of rules regarding types of references and access rights are contemplated.

The compliance tool 102 or other components associated with the environment 100 can be configured to remove references that do not comply with the one or more rules from the website or web application data. For instance, if a non-complying reference is posted in a forum, the compliance tool 102 can be configured to remove the reference so that the reference does not appear to users who access the forum. In embodiments, the reference can be removed from the repository 110. Further, in embodiments, the compliance tool 102 can provide an indication to users that the reference has been removed. In embodiments, the server 108 can comprise a firewall 116 that can be used to register violations with the one or more rules. For example, the compliance tool 102 can automatically or manually register violations with a firewall such as a web application firewall (WAF). In embodiments, the WAF can block connection attempts to network locations that contain references registered with the WAF or are otherwise in violation of the rules (e.g. the whitelist). It should be appreciated, however, that the firewall 116 can be implemented in any location within the environment 100.

In embodiments, once the compliance tool 102 compares the references from the enumerated list to the one or more rules, the compliance tool 102 can be configured to provide a report 112 to a user or operator of the compliance tool 102, clients 104, and/or the server 108. The report 112 can be configured to include the identified vulnerable or unapproved references, identified safe or approved references, a risk level, a rank of the vulnerable references, and other relevant information. The compliance tool 102 can be configured to provide the report 112 in any type of format that is accessible by a user, administrator, or operator of the compliance tool 102, clients 104, and/or the server 108. For example, the compliance tool 102 can be configured to create and output a graphical user interface (GUI) that comprises the report 112. Likewise, the compliance tool 102 can be configured to output the report 112 in other formats, such as electronic mail (email), Hyper Text Markup Language (HTML) document, text or word processing document, and the like.

The compliance tool 102 can be configured to scan and test a single website or web application associated with the server 108. Likewise, it should be appreciated that the compliance tool 102 can be configured to scan and test multiple websites or web applications, concurrently, for compliance with one or more rules. In embodiments, the compliance tool 102 can be configured to output the report 112 as a compilation of the results of scanning and testing the multiple websites or web applications for compliance with the one or more rules.

In embodiments, the compliance tool 102 can facilitate the publication of content after the content is scanned and a compliance of the content is determined. For instance, a website or web application that is scanned can be published if the references in the website or web application comply with the rules of the compliance tool 102. In embodiments, the systems and methods can prevent the content from being published if the content does not comply with the rules of the compliance tool 102.

In embodiments, the compliance tool 102 can be configured as an application program that is capable of being stored on and executed by the computing systems of the environment 100. For example, the compliance tool 102 can be an application program such as NeXpose™ from Rapid7, LLC. The compliance tool 102 can be written in a variety of programming languages, such as JAVA, C++, Python code, Visual Basic, hypertext markup language (HTML), extensible markup language (XML), and the like to accommodate a variety of operating systems, computing system architectures, etc.

In embodiments, as described herein, the compliance tool 102 can be implemented and executed on any of the computing systems of environment 100 in order to test and analyze vulnerabilities associated with websites or web applications hosted by the server 108. For example, in embodiments, the systems and methods as described herein can be delivered as a software as a service (SaaS) model whereby a provider can license the systems and methods as described herein for use as a service on demand implemented on local or remote resources. For further example, the compliance tool 102 can be implemented and executed on the server 108 that is being tested. Likewise, the compliance tool 102 can access, or can be implemented and executed on a remote server 114. In this example, the compliance tool 102 can remotely test and analyze websites or web applications associated with the remote server 114 via the network 106, as well as websites or web applications hosted and served by the server 108. When configured as an application program, the compliance tool 102 can be stored on any type of computer readable storage medium, such as hard drives, optical storage, system memory, and the like, of the computing systems of the environment 100.

Figure 2:
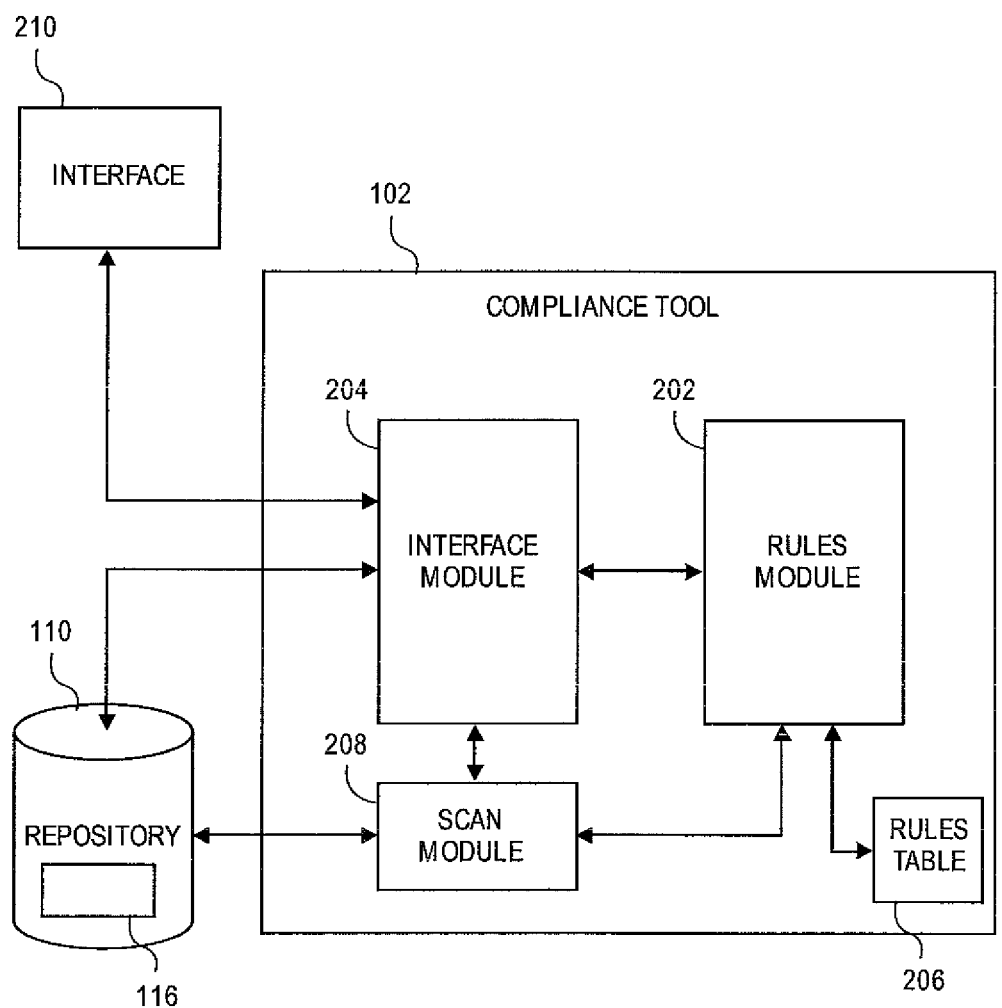
FIG. 2 is a block diagram of an exemplary configuration of a compliance tool, according to various embodiments.

FIG. 2 is a block diagram of an exemplary configuration of the compliance tool 102. As illustrated, the compliance tool 102 can comprise an interface module 204, a rules module 202, and a scan module 208. While FIG. 2 illustrates various components of the compliance tool 102, one skilled in the art will realize that existing components can be removed or additional components added.

In embodiments, the interface module 204 can be configured to provide an interface to the compliance tool 102. The interface module 204 can be configured to generate one or more interfaces 210 that allow a user to initiate the compliance tool 102, operate the compliance tool 102, and receive information generated by the compliance tool 102, such as the report 112. To achieve this, the interface module 204 can be configured to include the necessary logic, commands, instructions and routines to generate and communicate with GUIs and/or command-line interfaces. Further, the interface 210 can enable a user, owner, or administrator to initiate, interact with, and receive information from the compliance tool 102, whether locally or remotely accessing the compliance tool 102. The interface module 204 can be configured include the necessary logic, commands, instructions and routines to receive and output information in any formats, such as email, HTML document, text or word processing document, and the like.

In embodiments, the interface module 204 can communicate with the rules module 202 and the scan module 208. In embodiments, the scan module 208 can be configured to generate an enumerated list of references contained in a website or web application hosted by, served by, or otherwise associated with the server 108. To achieve this, the rules module 202 can be configured to include the necessary logic, commands, instructions and routines to scan the websites or web applications in order to identify the references to the network locations. In particular, the scan module 208 can be configured to include the necessary logic, commands, instructions and routines to search website or web application data stored in the repository 110 and to retrieve the information from the repository 110 in order to identify the references to the network locations, compile the references, and provide the references to the rules module 202.

In embodiments, the scan module 208 can automatically or manually compile the enumerated list. In embodiments, the scan module 208 can be a "crawler" that can traverse a website or web application, a static source code analyzer that can analyze source code of the website or web application, and/or a binary code analyzer which can analyze compiled binary code or bytecode of the website or web application. In embodiments, the enumerated list can be generated by a remote or external service, and the remotely generated enumerated list can be stored in a remote or external database. For example, the enumerated list can be generated by an external source or service that can search websites or web applications such as, for example, Google. The scan module 208 or other components of the compliance tool 102 can access the remotely generated enumerated list from the database or another source, or via an application programming interface (API) of the external source.

In embodiments, the rules module 202 can be configured to determine compliance of references contained in the enumerated list with the one or more rules utilizing the process described herein. In embodiments, the rules module 202 can receive the enumerated list from the scan module 208. Further, rules module 202 can be configured to include the necessary logic, commands, instructions and routines to determine compliance of references in the enumerated list with one or more rules of a rules table 206. The rules module 202 can be configured to provide a result of the compliance determination to the interface module 204, which can interface with the user of the compliance tool 102. In embodiments, the interface module 204 can register any violations of the one or more rules with the firewall 116 that can be implemented in the repository 110. In embodiments, the rules module 202 can initiate a baseline scan of a website or web application, and can infer a whitelist policy based on the baseline scan. Further, the rules module 202 can be configured to use the inferred whitelist policy in determining the compliance of any future scans of the website or web application.

In embodiments, the rules table 206 that can store the one or more rules that can be used to determine whether the references to the network locations are in compliance. In embodiments, the rules table 206 can store associated whitelists of approved URLs, domains, URL patterns, file extensions, file types, and the like, threat levels associated with the data in the whitelists, as well as a list of one or more approved certificate authorities.

In embodiments, as illustrated in FIG. 2, the interface module 204, the rules module 202, and the scan module 208 can be implemented in a single application program capable of executing on the computing systems of environment 100. Likewise, interface module 204, the rules module 202, and the scan module 208 can be implemented as separate application programs that are capable of executing on separate computing systems of the environment 100. Additionally, the interface module 204 can be configured to communicate with multiple rules modules 202 and scan modules 208.

Figure 3:
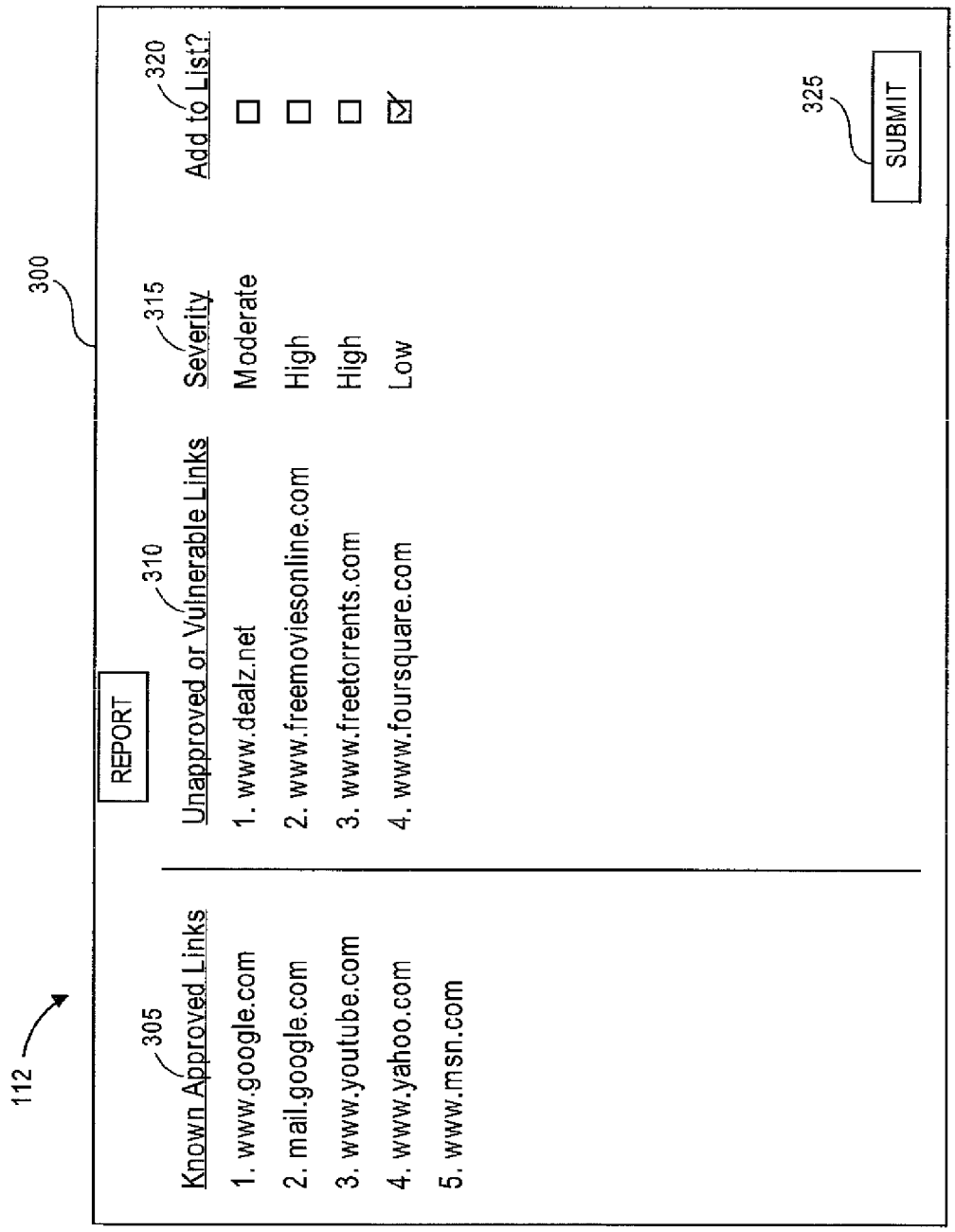
FIG. 3 is an exemplary diagram of interfaces generated by the compliance tool for providing reports, according to various embodiments.

FIG. 3 illustrates an exemplary GUI 300 for displaying the report 112. The GUI 300 can be a GUI utilized to communicate with the compliance tool 102 in order to control the compliance tool 102 and receive the report 112. As illustrated, the GUI 300 can display the report 112. The report 112 can be configured as a table that comprises a column 305 for displaying an identification of known approved references. In embodiments, the references in column 305 can be links detected from website or web application data that comply with the rules of the compliance tool 102. The report 112 can further comprise a column 310 for displaying an identification of unapproved references, vulnerable references, or any references that do not comply with the rules of the compliance tool 102. In embodiments, the references in column 310 can be links on a website or web application that do not appear on an approved list or whitelist of approved sites as stored in the compliance tool 102. The identifications and references displayed in the columns 305, 310 can further comprise a link that allows the user to retrieve more information about the approved or unapproved references, such as, for example, more information stored in the compliance tool 102.

The report 112 can further comprise a column 315 that identifies a severity of the vulnerable references of column 310. For example, the severity of the vulnerable references can be low, moderate, or high. In embodiments, the compliance tool 102 can determine the severity of the vulnerable references based on historical data, empirical data, research data, or other data stored in the compliance tool 102, the repository 110, or in other entities. In embodiments, the greater the severity of the vulnerable references, the greater the risk to a user accessing the corresponding location. The report 112 can further comprise a column 320 that allows a user or viewer of the report 112 to deem a vulnerable reference displayed in column 310 as complying with one or more of the rules of the compliance tool 102. In embodiments, a user can add a vulnerable reference of column 310 to a whitelist of approved network locations. For example, as shown in FIG. 3, a user can add the reference www.foursquare.com that appears in column 310 to a whitelist of approve network locations by selecting a checkbox corresponding to the reference and selecting a submit 325 button. In embodiments, the ability to add a reference to the whitelist can be based on an authorization level of the user of the report 112. For example, only administrators or owners of a website or web application may be able to add a reference to the whitelist. It should be appreciated that the report 112 as shown in FIG. 3 is merely exemplary and that other embodiments of the report 112 with associated options and display items are envisioned.

Figure 4:
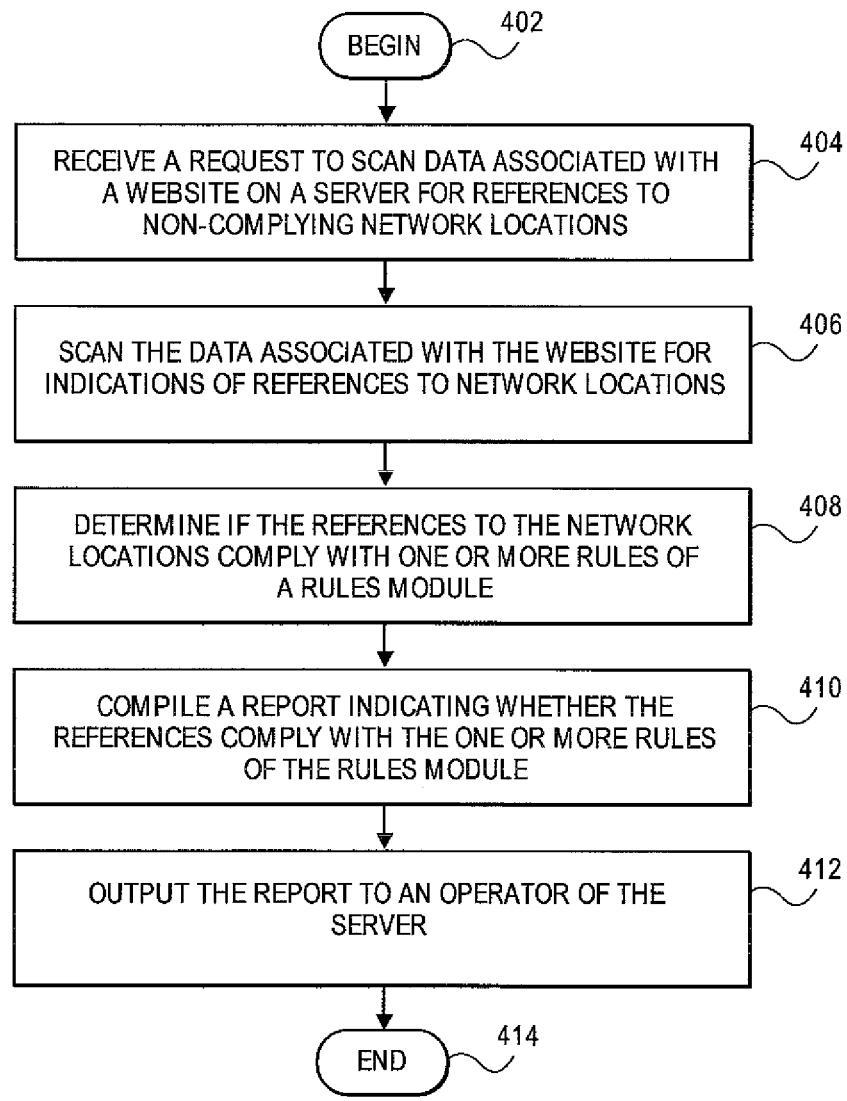
FIG. 4 is a flow diagram of exemplary processes performed by the compliance tool, according to various embodiments.

As discussed herein, the compliance tool 102 can be configured to test and analyze vulnerabilities in websites or web applications hosted by a server. FIG. 4 is a flow diagram that illustrates an exemplary process by which compliance tool 102 can test and analyze vulnerabilities in websites or web applications hosted by the server 108. In 402, the process can begin.

In 404, the compliance tool 102 can receive a request to scan data associated with a website or web application on the server 108 for references to non-complying network locations. In embodiments, the request can be received locally or remotely from an owner, operator, or a user of the website or web application. In further embodiments, the website or web application to be scanned can be hosted by the server 108. In 406, the scan module 208 associated with compliance tool 102 can scan the data associated with the website or web application for indications of references to network locations, and generate an enumerated list of references. In embodiments, the data to be scanned can comprise any data associated with the website or web application, and the indications of the references can be URLs, embeds, domains, URL patterns, file extensions, file types, and/or combinations thereof that can be contained in the website or web application data.

In 408, the compliance tool 102 can determine if the references to the network locations comply with one or more rules of the compliance tool 102. In embodiments, as detailed herein, the one or more rules of the rules table 206 can comprise compliance with a whitelist of approved URLs, domains, embeds, URL patterns, file extensions, file types, and the like. In further embodiments, as detailed herein, the one or more rules can comprise compliance with a possession of a security key signed by an approved certificate authority. It should be appreciated that other compliance rules of the compliance tool 102 are contemplated. In 410, the compliance tool 102 can compile a report indicating whether the references comply with the one or more rules of the compliance tool 102. In embodiments, the report can comprise a listing of references that comply with the one or more rules as well as references that do not comply with the one or more rules. In further embodiments, a user or viewer of the report can select non-complying references to be added to an approved list or whitelist.

In 412, the compliance tool 102 can output the report to an operator of the server 108. In embodiments, the report can be output to any individual, business, or other entity associated with the original request. In further embodiments, the output can be via the GUI 300, email, printer, fax, and/or any other data communication or output method.

In 414, the process can end, return to any point or repeat.

Figure 5:
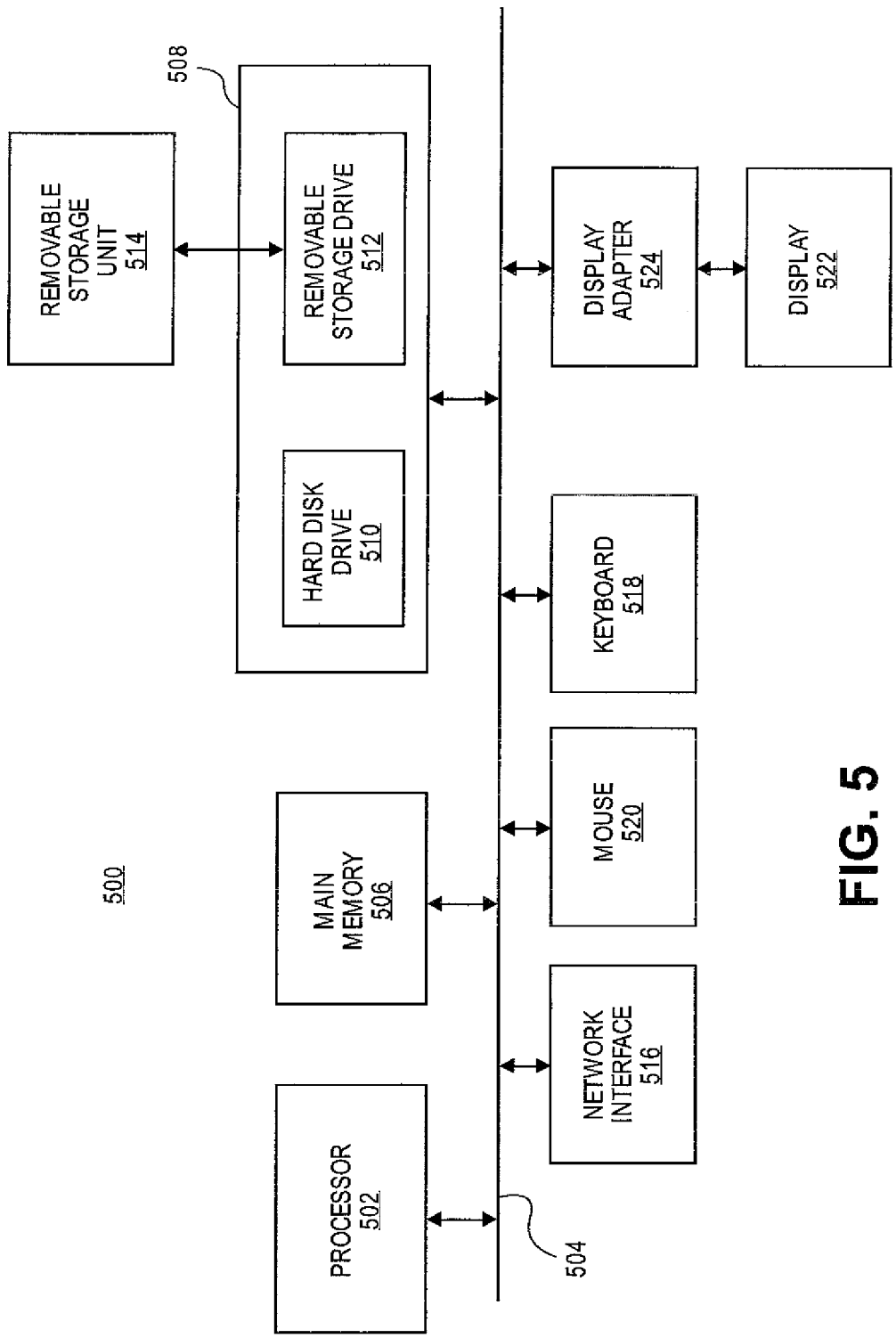
FIG. 5 is a block diagram of an exemplary computing system, according to various embodiments.

FIG. 5 illustrates an exemplary block diagram of a computing system 500 which can be implemented on the clients 104 and/or the server 108 according to various embodiments. In embodiments, the compliance tool 102 and/or the components thereof such as the scan module 208 can be stored and executed on the computing system 500 in order to perform the processes described above. Likewise, the compliance tool 102 and/or the components of the compliance tool 102 can be stored and executed remotely and can be configured to communicate with the computing system 500 in order to perform the process described above. While FIG. 5 illustrates various components of the computing system 500, one skilled in the art will realize that existing components can be removed or additional components can be added.

As shown in FIG. 5, the computing system 500 can include one or more processors, such as processor 502 that can provide an execution platform for embodiments of the compliance tool 102. Commands and data from the processor 502 are communicated over a communication bus 504. The computing system 500 can also include a main memory 506, for example, one or more computer readable storage media such as a Random Access Memory (RAM), where the compliance tool 102 and other application programs, such as an operating system (OS) can be executed during runtime, and can include a secondary memory 508. The secondary memory 508 can include, for example, one or more computer readable storage media or devices such as a hard disk drive 510 and/or a removable storage drive 512, representing a floppy diskette drive, a magnetic tape drive, a compact disk drive, etc., where a copy of a application program embodiment for the compliance tool 102 can be stored. The removable storage drive 512 reads from and/or writes to a removable storage unit 514 in a well-known manner. The computing system 500 can also include a network interface 516 in order to connect with the network 106.

In embodiments, a user can interface with the computing system 500 and operate the compliance tool 102 with a keyboard 518, a mouse 520, and a display 522. To provide information from the computing system 500 and data from the compliance tool 102, such as the report 112, the computing system 500 can include a display adapter 524. The display adapter 524 can interface with the communication bus 504 and the display 522. The display adapter 524 can receive display data from the processor 502 and convert the display data into display commands for the display 522.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method of determining compliance of content in a website or web application, the method comprising:
   receiving a request to scan a website or a web application comprising a reference to a network location, wherein the request is received from a responsible entity of the website or web application;
   scanning the website or the web application;
   identifying, by a processor, the reference to the network location based on scanning the website or the web application;
   determining that the reference to the network location is not contained in a list of approved references to network locations;
   determining whether the reference to the network location complies with rules, wherein the rules comprises a compliance with valid domains, a compliance with valid universal resource locators (URLs), compliance with valid JavaScript links, compliance with valid URL patterns, compliance with valid file extensions, compliance with valid file types, possession of signed security keys from an approved certificate authority, and at least one rule based on a hierarchical structure within an entity;
   scanning content of the network location accessible via the reference;
   determining, based on the scan of the content, whether the network location includes malicious content, the malicious content comprising at least one of spyware, malware, or a virus;
   in response to the network location including malicious content:
     reporting, to the responsible entity of the website or that web application, that the reference to the network location is associated with malicious content; and
   in response to the network location not including malicious content:
     adding the reference to the network location to the list of approved references to network locations.

2. The method of claim 1, the method further comprising:
   providing a report indentifying that that the network location does not include malicious content, wherein providing the report comprises displaying the report in a graphical user interface (GUI).

3. The method of claim 1, the method further comprising:
   receiving, prior to adding the reference, a request to add the reference to the network location to the list of approved references to network locations.

4. The method of claim 1, the method further comprising:
   analyzing the content of the network location that is accessible via the reference;
   determining, based on the analyzing, that the network location includes malicious content; and
   removing the reference to the network location from the website or web application.

5. The method of claim 1, the method further comprising:
analyzing the content of the network location that is accessible via the reference;
determining, based on the analyzing, that the network location includes malicious content; and
removing the reference to the network location from the list of approved references to network locations.

6. The method of claim 1, the method further comprising:
publishing the website or web application if the reference to the network location complies with the one or more approval rules.

7. The method of claim 1, wherein scanning the website or the web application comprises traversing the website or web application, analyzing source code of the website or web application, or analyzing compiled binary code or bytecode of the website or web application.

8. The method of claim 1, the method further comprising:
retrieving the content of the network location.

9. A non-transitory computer readable storage medium embodying instructions for causing a processor to perform a method comprising:
receiving a request to scan a website or a web application comprising a reference to a network location, wherein the request is received from a responsible entity of the website or web application;
scanning the website or the web application;
identifying, by a processor, the reference to the network location based on scanning the website or the web application;
determining that the reference to the network location is not contained in a list of approved references to network locations;
determining whether the reference to the network location complies with rules, wherein the rules comprises a compliance with valid domains, a compliance with valid universal resource locators (URLs), compliance with valid JavaScript links, compliance with valid URL patterns, compliance with valid file extensions, compliance with valid file types, possession of signed security keys from an approved certificate authority, and at least one rule based on a hierarchical structure within an entity;
scanning content of the network location accessible via the reference;
determining, based on the scan of the content, whether the network location includes malicious content, the malicious content comprising at least one of spyware, malware, or a virus;
in response to the network location including malicious content:
reporting, to the responsible entity of the website or that web application, that the reference to the network location is associated with malicious content; and
in response to the network location not including malicious content:
adding the reference to the network location to the list of approved references to network locations.

10. The non-transitory computer readable storage medium of claim 9, the method further comprising:
providing a report identifying that the network location does not include malicious content, wherein providing the report comprises displaying the report in a graphical user interface (GUI).

11. The non-transitory computer readable storage medium of claim 9, the method further comprising:
receiving, prior to adding the reference, a request to add the reference to the network location to the list of approved references to network locations.

12. The non-transitory computer readable storage medium of claim 9, the method further comprising:
analyzing the content of the network location that is accessible via the reference;
determining, based on the analyzing, that the network location includes malicious content; and
removing the reference to the network location from the website or web application.

13. The non-transitory computer readable storage medium of claim 9, the method further comprising:
publishing the website or web application if the reference to the network location complies with the one or more approval rules.

14. The non-transitory computer readable storage medium of claim 9, wherein scanning the website or the web application comprises traversing the website or web application, analyzing source code of the website or web application, or analyzing compiled binary code or bytecode of the website or web application.

15. The non-transitory computer readable storage medium of claim 9, the method further comprising:
retrieving the content of the network location.

16. A system for determining compliance of content in a website or web application, comprising:
a processor; and
a computer readable storage medium coupled to the processor and comprising instructions for causing the processor to perform a method comprising:
receiving a request to scan a website or a web application comprising a reference to a network location, wherein the request is received from a responsible entity of the website or web application;
scanning the website or the web application;
identifying, by the processor, the reference to the network location based on scanning the website or the web application;
determining that the reference to the network location is not contained in a list of approved references to network locations;
determining whether the reference to the network location complies with rules, wherein the rules comprises a compliance with valid domains, a compliance with valid universal resource locators (URLs), compliance with valid JavaScript links, compliance with valid URL patterns, compliance with valid file extensions, compliance with valid file types, possession of signed security keys from an approved certificate authority, and at least one rule based on a hierarchical structure within an entity;
scanning content of the network location accessible via the reference;
determining, based on the scan of the content, whether the network location includes malicious content, the malicious content comprising at least one of spyware, malware, or a virus;
in response to the network location including malicious content:
reporting, to the responsible entity of the website or that web application, that the reference to the network location is associated with malicious content; and
in response to the network location not including malicious content:
adding the reference to the network location to the list of approved references to network locations.

17. The system of claim 16, the method further comprising:
providing a report identifying that the network location does not include malicious content, wherein providing the report comprises displaying the report in a graphical user interface (GUI).

18. The system of claim 16, the method further comprising:
receiving, prior to adding the reference, a request to add the reference to the network location to the list of approved references to network locations.

19. The system of claim 16, the method further comprising:
analyzing the content of the network location that is accessible via the reference;
determining, based on the analyzing, that the network location includes malicious content; and
removing the reference to the network location from the website or web application.

20. The system of claim 16, the method further comprising:
publishing the website or web application if the reference to the network location complies with one or more approval rules.

21. The system of claim 16, wherein scanning the website or the web application comprises traversing the website or web application, analyzing source code of the website or web application, or analyzing compiled binary code or bytecode of the website or web application.

22. The system of claim 16, the method further comprising:
retrieving the content of the network location.

* * * * *